B. S. JOHNSON.
FRICTION SHOCK ABSORBING MECHANISM.
APPLICATION FILED DEC. 18, 1920.
1,398,696.
Patented Nov. 29, 1921.
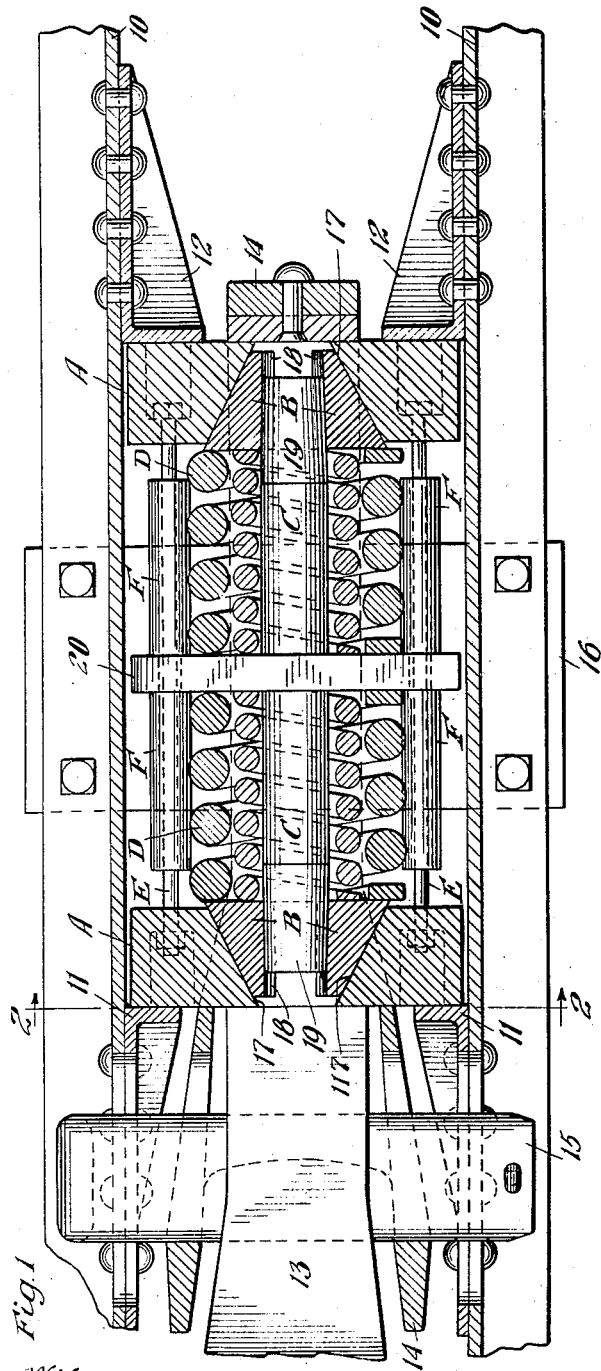
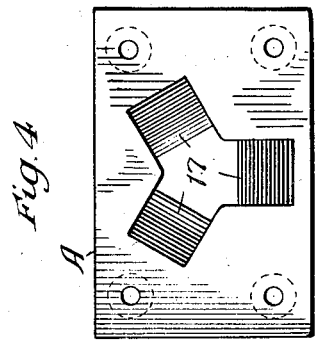
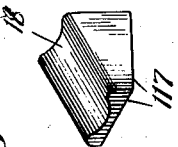
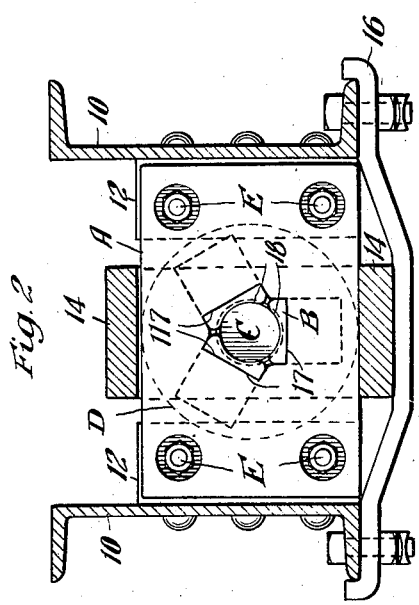
Witnesses
Wm. Geiger
Inventor
Bradley S. Johnson
By Geo. I. Haight
His Atty.

UNITED STATES PATENT OFFICE.

BRADLEY S. JOHNSON, OF CHICAGO, ILLINOIS, ASSIGNOR TO WILLIAM H. MINER, OF CHAZY, NEW YORK.

FRICTION SHOCK-ABSORBING MECHANISM.

1,398,696.   Specification of Letters Patent.   Patented Nov. 29, 1921.

Application filed December 18, 1920. Serial No. 431,745.

*To all whom it may concern:*

Be it known that I, BRADLEY S. JOHNSON, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

The object of the invention is to provide a friction shock absorbing mechanism especially adapted for railway draft riggings and wherein is employed a double-ended arrangement of friction elements of simple and efficient design.

In the drawing forming a part of this specification, Figure 1 is a longitudinal, horizontal, sectional view of a portion of a railway draft rigging showing my improvements in connection therewith. Fig. 2 is a vertical, transverse, sectional view taken substantially on the line 2—2 of Fig. 1. Fig. 3 is a detail perspective of one of the friction shoes employed in my construction. And Fig. 4 is an elevational view of one of the end wedge followers, the elevation being taken from the inner side thereof.

In said drawing, 10—10 denote channel draft sills of a railway car to the inner faces of which are secured front stop lugs 11 and rear stop lugs 12. The rear portion of a drawbar is indicated at 13, the same being operatively connected with the shock absorbing mechanism proper by means of a hooded cast yoke 14 and coupler key 15. The shock absorbing mechanism proper is disposed within the yoke 14 and the parts are supported in operative position by a detachable saddle plate 16.

The shock absorbing mechanism proper, as shown, comprises, broadly, front and rear combined wedge followers A—A; front and rear sets of friction shoes B—B; a central friction stem or plunger C; front and rear independent springs D—D; four connecting bolts E—E; and front and rear sets of limiting spacers F—F.

Each of the wedge followers A is preferably in the form of a substantial and comparatively thick casting, the same being centrally apertured so as to provide a plurality of wedge faces 17—17, the same converging from the inner side of the follower to the outer side thereof. As shown, there are three of said faces 17 as indicated in Fig. 4, the same being uniformly spaced.

The friction shoes B are all preferably of like construction, there being three in each front and rear set. Each of said shoes B is formed on its outer side with a flat wedge face 117 adapted to coöperate with a corresponding wedge face on the member A. On its inner side, each shoe B is formed with a cylindrical friction surface 18 adapted to coöperate with the corresponding adjacent end of the friction plunger C. The latter is of true cylindrical form throughout the greater part of its length but at each end is preferably slightly tapered as indicated at 19 where it coöperates with the friction surfaces of the shoes B, this being done in order to facilitate the release, after the device has been actuated.

The plunger C is provided intermediate its ends and preferably at its center with an integral or otherwise rigidly associated flange 20 which may be of substantially the same rectangular cross section as the members A. Said flange 20 forms an abutment for the inner adjacent ends of the two springs D, as will be clear from an inspection of Fig. 1, the opposite ends of the springs D bearing upon the shoes B—B.

The central flange 20 is perforated at the four corners thereof in alinement with corresponding perforations in the two wedge followers A in order to accommodate the four bolts E. The heads and nuts of the bolts E are preferably countersunk as shown in Fig. 1 and as will be understood, said bolts maintain the parts in assembled relation.

On each of the bolts E are mounted two spacing or limiting sleeves F, one on each side of the plunger flange 20. The length of each spacer sleeve F is less than the normal distance between the flange 20 and corresponding wedge member A in an amount equal to approximately one-half of the permissible compression stroke of the mechanism so that said limiting sleeves F, in conjunction with the flanges 20 and members A, limit the movement of the plunger C with respect to each member A to an amount less than the permissible full compression stroke of the mechanism. With this arrangement, during the full actuation of the mechanism, I positively insure the movement of the plunger C with respect to both sets of friction shoes B and wedge followers A. Furthermore, the limiting spacers or sleeves F prevent over-compression of either spring D. By insuring the actuation of both end sets of mechanisms during each compression stroke, whether under buff or draft, I reduce the wear on the sliding friction parts to a minimum and enlarge the wearing area. At the end of the full compression stroke, it will be observed that the sleeves F in conjunction with the flange 20 form four columns to assist in transmitting the ultimate loads to the stop lugs 11 or 12.

I have herein shown and described what I now consider the preferred manner of carrying out the invention but the same is merely illustrative. It will be obvious to those skilled in the art that various changes may be made in the details of construction, as for instance in the cross section of the friction plunger, the angles and numbers of the wedge faces and friction shoes, and also the amount which the friction plunger may be permitted to travel with respect to either wedge follower A. All such changes and modifications are contemplated that come within the scope of the claims appended hereto.

I claim:

1. In a friction shock absorbing mechanism, the combination with end wedge members; of a central plunger having friction surfaces at each end thereof; a set of friction shoes coöperable with each wedge member and corresponding end of the plunger; spring means coöperable with the friction shoes; and means for limiting the movement of the plunger with respect to either wedge member to an amount less than the full stroke of the mechanism whereby to insure actuation of all friction shoes and both ends of the plunger during a full compression of the mechanism.

2. In a friction shock absorbing mechanism, the combination with two end followers provided on the inner sides thereof with wedge faces converging from the inner side to the outer side of each follower; of a central plunger extending between said followers, said plunger having friction surfaces at its ends; a set of friction shoes coöperable with the wedge faces of each follower and corresponding end of the plunger; spring means coöperable with the friction shoes; and means for limiting the movement of the plunger with respect to each follower to an amount less than the full stroke of the mechanism whereby to insure actuation of all friction shoes and both ends of the plunger during a full compression.

3. In a friction shock absorbing mechanism, the combination with end wedge members; of a central plunger having friction surfaces at each end thereof; a set of friction shoes coöperable with each wedge member and corresponding end of the plunger; spring means coöperable with the friction shoes; and means for limiting the movement of the plunger with respect to either wedge member to an amount less than the full stroke of the mechanism whereby to insure actuation of all friction shoes and both ends of the plunger during a full compression of the mechanism, said means including a flange rigidly associated with the plunger and located intermediate its ends, and spacers interposed between said flange and each wedge member.

4. In a friction shock absorbing mechanism, the combination with two end followers provided on the inner sides thereof with wedge faces converging from the inner side to the outer side of each follower; of a central plunger extending between said followers, said plunger having friction surfaces at its ends; a set of friction shoes coöperable with the wedge faces of each follower and corresponding end of the plunger; spring means coöperable with the friction shoes; and means for limiting the movement of the plunger with respect to each follower to an amount less than the full stroke of the mechanism whereby to insure actuation of all friction shoes and both ends of the plunger during the full compression, said means including a flange rigidly associated with the plunger and located intermediate its ends, and limiting spacers interposed between said flange and each of the followers.

5. In a friction shock absorbing mechanism, the combination with a pair of end followers, each being provided with wedge faces on its inner side converging from the inner side to the outer side thereof; of means limiting the separation of said followers; a central friction plunger having an integral flange intermediate its ends; a set of friction shoes coöperable with the wedge faces of each follower and corresponding end of the plunger; and a spring resistance interposed between each set of friction shoes and flange of the plunger.

6. In a friction shock absorbing mechanism, the combination with a pair of end followers, each being provided with wedge faces on its inner side converging from the inner side to the outer side thereof; of means limiting the separation of said followers; a central friction plunger having an integral flange intermediate its ends; a set of friction shoes coöperable with the wedge faces of each follower and corresponding end of the plunger; a spring resistance interposed between each set of friction shoes and flange of the plunger; and means limiting the movement of the plunger with respect to each follower to an amount less than the full compression stroke of the mechanism.

In witness that I claim the foregoing I have hereunto subscribed my name this 26th day of Nov., 1920.

BRADLEY S. JOHNSON.

Witnesses:
META SCHMIDT,
UNA C. PERIN.